(12) United States Patent
Huang (10) Patent No.: US 11,095,320 B2
(45) Date of Patent: Aug. 17, 2021

(54) COMMUNICATION SYSTEM AND COMMUNICATION METHOD (71) Applicant: Wistron NeWeb Corp., Hsinchu (TW)

(72) Inventor: Chun-Lin Huang, Hsinchu (TW)

(73) Assignee: WISTRON NEWEB CORP., Hsinchu (TW)

(*) Notice: Subject to any disclaimer, the term of this patent is extended or adjusted under 35 U.S.C. 154(b) by 154 days.

(21) Appl. No.: 16/700,029

(22) Filed: Dec. 2, 2019

(65) Prior Publication Data

US 2021/0036723 A1 Feb. 4, 2021

(30) Foreign Application Priority Data

Aug. 1, 2019 (TW) ................................. 108127349

(51) Int. Cl.
*H04B 1/00* (2006.01)
*H04B 1/18* (2006.01)

(52) U.S. Cl.
CPC ............. *H04B 1/0057* (2013.01); *H04B 1/18* (2013.01)

(58) Field of Classification Search
CPC ........... H04B 1/0057; H04B 1/18; H01Q 5/00
See application file for complete search history.

(56) References Cited

U.S. PATENT DOCUMENTS

| | | | | |
|---|---|---|---|---|
| 9,154,243 B2* | 10/2015 | Fernando | ................ | H04B 17/21 |
| 2009/0086655 A1* | 4/2009 | Ghadaksaz | ........ | H04B 7/15542 |
| | | | | 370/293 |
| 2010/0283692 A1* | 11/2010 | Achour | ................ | H01Q 21/065 |
| | | | | 343/702 |
| 2011/0116423 A1* | 5/2011 | Rousu | .................... | H01Q 1/521 |
| | | | | 370/297 |
| 2011/0175789 A1* | 7/2011 | Lee | ........................... | H01Q 5/20 |
| | | | | 343/853 |
| 2012/0194293 A1* | 8/2012 | Dupont | ..................... | H01P 5/18 |
| | | | | 333/109 |
| 2015/0071137 A1* | 3/2015 | Thiam | .................. | H04B 7/0413 |
| | | | | 370/297 |
| 2016/0112072 A1* | 4/2016 | Bauder | ................ | H04B 7/0602 |
| | | | | 370/297 |

(Continued)

OTHER PUBLICATIONS

"Compact Waveguide Dual-Band Filters and Diplexers"; Zhu et al.; IEEE Transactions on Microwave Theory and Techniques, vol. 65, No. 5, May 2017 (Year: 2017).*

(Continued)

*Primary Examiner* — Benjamin H Elliott, IV
(74) *Attorney, Agent, or Firm* — McClure, Qualey & Rodack, LLP (57) ABSTRACT

A communication system with a first input port and a second input port includes a first antenna, a second antenna, a first diplexer, a second diplexer, a third diplexer, a fourth diplexer, a first coupler, and a second coupler. The first diplexer has a common terminal coupled to the first input port. The second diplexer has a common terminal coupled to the second input port. The third diplexer has a common terminal coupled to the first antenna. The fourth diplexer has a common terminal coupled to the second antenna. Each of the first diplexer, the second diplexer, the third diplexer, and the fourth diplexer has a first terminal and a second terminal which are coupled between the first coupler and the second coupler.

19 Claims, 7 Drawing Sheets

(56) References Cited

U.S. PATENT DOCUMENTS

2019/0081694 A1\* 3/2019 Zhou .................. H05K 1/189
2021/0036723 A1\* 2/2021 Huang ................. H04B 1/18

OTHER PUBLICATIONS

"Miniaturized Single-Ended and Balanced Dual-Band Diplexers Using Dielectric Resonators"; Li et al.; IEEE Transactions on Microwave Theory and Techniques, vol. 68, No. 10, Oct. 2020 (Year: 2020).\*

\* cited by examiner

S510 — Provide a communication system, wherein the communication system with a first input port and a second input port includes a first antenna, a second antenna, a first diplexer, a second diplexer, a third diplexer, a fourth diplexer, a first coupler, and a second coupler, wherein the first diplexer is coupled to the first input port, the first coupler, and the second coupler, wherein the second diplexer is coupled to the second input port, the first coupler, and the second coupler, wherein the first antenna is coupled through the third diplexer to the first coupler and the second coupler, and wherein the second antenna is coupled through the fourth diplexer to the first coupler and the second coupler S520 — Input a dual-band signal to the first diplexer and the second diplexer, wherein the dual-band signal includes a first band signal and a second band signal, and wherein both the first diplexer and the second diplexer are configured to separate the first band signal from the second band signal S530 — Input the first band signal and the second band signal which are separated by the first diplexer to the first coupler and the second coupler, respectively, so as to generate a first phase difference S540 — Input the first band signal and the second band signal which are separated by the second diplexer to the first coupler and the second coupler, respectively, so as to generate a second phase difference S550 — Combine, via the third diplexer, the first band signal and the second band signal which have the first phase difference, so as to form a first phase dual-band signal S560 — Combine, via the fourth diplexer, the first band signal and the second band signal which have the second phase difference, so as to form a second phase dual-band signal S570 — Transmit, via the first antenna, the first phase dual-band signal, and transmit, via the second antenna, the second phase dual-band signal, so as to form a synthetic beam toward a direction

COMMUNICATION SYSTEM AND COMMUNICATION METHOD

CROSS REFERENCE TO RELATED APPLICATIONS

This application claims priority of Taiwan Patent Application No. 108127349 filed on Aug. 1, 2019, the entirety of which is incorporated by reference herein.

BACKGROUND OF THE INVENTION

Field of the Invention

The disclosure generally relates to a communication system, and more particularly, it relates to a communication system with a tunable radiation beam.

Description of the Related Art

With the advancements being made in mobile communication technology, mobile devices such as portable computers, mobile phones, multimedia players, and other hybrid functional portable electronic devices have become more common. To satisfy user demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, 2500 MHz, and 2700 MHz. Some devices cover a small wireless communication area; these include mobile phones using Wi-Fi and Bluetooth systems and using frequency bands of 2.4 GHz, 5.2 GHz, and 5.8 GHz.

In order to achieve good communication quality and multiple operation frequency bands, multiband antennas and their corresponding multiple RF (Radio Frequency) modules may be disposed in current communication devices. However, these multiband antennas and RF modules usually take up a lot of space, and they cannot be designed inside devices that are small in size. Accordingly, there is a need to propose a novel solution for solving the problems of the prior art.

BRIEF SUMMARY OF THE INVENTION

In an exemplary embodiment, the invention is directed to a communication system with a first input port and a second input port. The communication device includes a first antenna, a second antenna, a first diplexer, a second diplexer, a third diplexer, a fourth diplexer, a first coupler, and a second coupler. The first diplexer has a common end, a first end, and a second end. The common end of the first diplexer is coupled to the first input port. The second diplexer has a common end, a first end, and a second end. The common end of the second diplexer is coupled to the second input port. The third diplexer has a common end, a first end, and a second end. The common end of the third diplexer is coupled to the first antenna. The fourth diplexer has a common end, a first end, and a second end. The common end of the fourth diplexer is coupled to the second antenna. The first coupler has a first port, a second port, a third port, and a fourth port. The first port of the first coupler is coupled to the first end of the first diplexer. The second port of the first coupler is coupled to the first end of the second diplexer. The third port of the first coupler is coupled to the first end of the third diplexer. The fourth port of the first coupler is coupled to the first end of the fourth diplexer. The second coupler has a first port, a second port, a third port, and a fourth port. The first port of the second coupler is coupled to the second end of the first diplexer. The second port of the second coupler is coupled to the second end of the second diplexer. The third port of the second coupler is coupled to the second end of the third diplexer. The fourth port of the second coupler is coupled to the second end of the fourth diplexer.

In some embodiments, when the communication system is fed by the first input port, a synthetic beam of the first antenna and the second antenna is emitted in a first direction. When the communication system is fed by the second input port, the synthetic beam of the first antenna and the second antenna is emitted in a second direction, which is different from the first direction.

In some embodiments, both the first antenna and the second antenna cover a first frequency band and a second frequency band. The first frequency band is from 2400 MHz to 2500 MHz. The second frequency band is from 5150 MHz to 5850 MHz.

In some embodiments, each of the first diplexer, the second diplexer, the third diplexer, and the fourth diplexer is configured as a frequency divider or a frequency combiner.

In some embodiments, each of the first coupler and the second coupler is a branch-line coupler.

In some embodiments, the first coupler substantially has a first hollow square shape. The length of each side of the first hollow square shape is substantially equal to 0.25 wavelength of the second frequency band. The second coupler substantially has a second hollow square shape. The length of each side of the second hollow square shape is substantially equal to 0.25 wavelength of the first frequency band.

In some embodiments, each of the first diplexer, the second diplexer, the third diplexer, and the fourth diplexer includes a first branch, a second branch, a third branch, and a fourth branch. The first branch is coupled between the corresponding common end and a first node. The second branch is coupled between the first node and the corresponding first end. The third branch is coupled to the first node. The fourth branch is coupled to the corresponding first end.

In some embodiments, each of the first diplexer, the second diplexer, the third diplexer, and the fourth diplexer further includes a fifth branch, a sixth branch, a seventh branch, an eighth branch, a ninth branch, and a tenth branch. The fifth branch is coupled between the corresponding common end and a second node. The sixth branch is coupled between the second node and a third node. The seventh branch is coupled between the third node and the corresponding second end. The eighth branch is coupled to the third node. The ninth branch is coupled to the second node. The tenth branch is coupled to the corresponding second end.

In some embodiments, the length of each of the first branch, the second branch, the third branch, and the fourth branch is substantially equal to 0.25 wavelength of the first frequency band.

In some embodiments, the length of each of the fifth branch, the sixth branch, the seventh branch, the eighth branch, the ninth branch, and the tenth branch is substantially equal to 0.25 wavelength of the second frequency band.

In another exemplary embodiment, the invention is directed to a communication which includes the steps of: providing a communication system, wherein the communication system with a first input port and a second input port includes a first antenna, a second antenna, a first diplexer, a second diplexer, a third diplexer, a fourth diplexer, a first coupler, and a second coupler, wherein the first diplexer is coupled to the first input port, the first coupler, and the second coupler, wherein the second diplexer is coupled to the second input port, the first coupler, and the second coupler, wherein the first antenna is coupled through the third diplexer to the first coupler and the second coupler, and wherein the second antenna is coupled through the fourth diplexer to the first coupler and the second coupler; inputting a dual-band signal to the first diplexer and the second diplexer, wherein the dual-band signal includes a first band signal and a second band signal, and wherein both the first diplexer and the second diplexer are configured to separate the first band signal from the second band signal; inputting the first band signal and the second band signal which are separated by the first diplexer to the first coupler and the second coupler, respectively, so as to generate a first phase difference; inputting the first band signal and the second band signal which are separated by the second diplexer to the first coupler and the second coupler, respectively, so as to generate a second phase difference; combining, via the third diplexer, the first band signal and the second band signal which have the first phase difference, so as to form a first phase dual-band signal; combining, via the fourth diplexer, the first band signal and the second band signal which have the second phase difference, so as to form a second phase dual-band signal; and transmitting, via the first antenna, the first phase dual-band signal, and transmitting, via the second antenna, the second phase dual-band signal, so as to form a synthetic beam toward a direction.

BRIEF DESCRIPTION OF DRAWINGS

The invention can be more fully understood by reading the subsequent detailed description and examples with references made to the accompanying drawings, wherein:

FIG. 5 is a flowchart of a communication method according to an embodiment of the invention.

DETAILED DESCRIPTION OF THE INVENTION

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1:
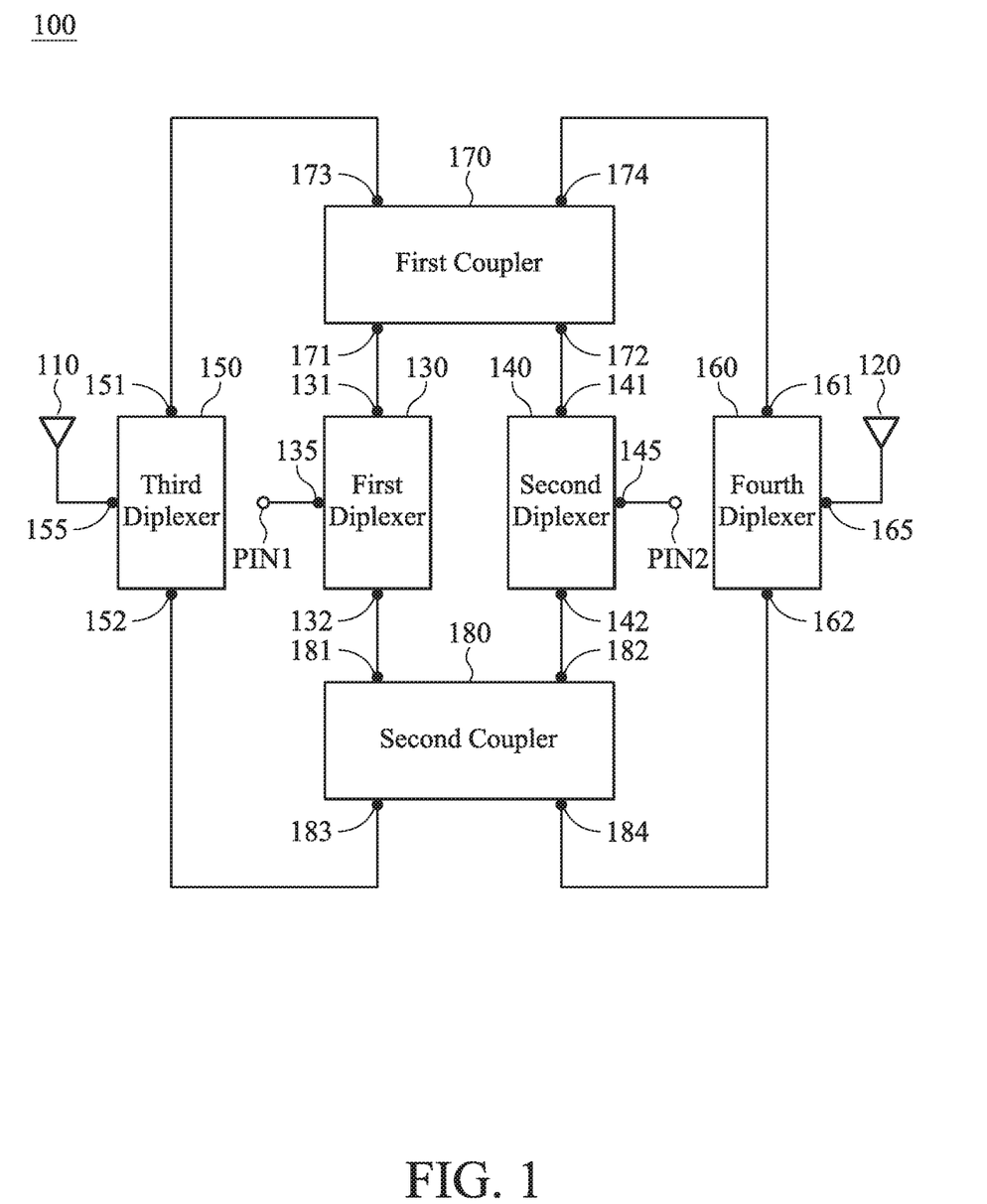
FIG. 1 is a diagram of a communication system according to an embodiment of the invention.

FIG. 1 is a diagram of a communication system 100 according to an embodiment of the invention. The communication system 100 may be applied to a wireless access point or a mobile device, such as a smart phone, a tablet computer, or a notebook computer. In the embodiment of FIG. 1, the communication system 100 with a first input port PIN1 and a second input port PIN2 includes a first antenna 110, a second antenna 120, a first diplexer 130, a second diplexer 140, a third diplexer 150, a fourth diplexer 160, a first coupler 170, and a second coupler 180. It should be noted that the communication system 100 further includes other components, such as a processor, a touch control module, a power supply module, and/or a housing, although they are not displayed in FIG. 1.

Each of the first antenna 110 and the second antenna 120 is a dual-band antenna for covering a first frequency band and a second frequency band. For example, the aforementioned first frequency band may be from 2400 MHz to 2500 MHz, and the aforementioned second frequency band may be from 5150 MHz to 5850 MHz. Therefore, the communication system 100 can support at least the dual-band operations of WLAN (Wireless Local Area Networks) 2.4 GHz/5 GHz.

The first diplexer 130 has a common end 135, a first end 131, and a second end 132. The common end 135 of the first diplexer 130 is coupled to the first input port PIN1. The second diplexer 140 has a common end 145, a first end 141, and a second end 142. The common end 145 of the second diplexer 140 is coupled to the second input port PIN2. The third diplexer 150 has a common end 155, a first end 151, and a second end 152. The common end 155 of the third diplexer 150 is coupled to the first antenna 110. The fourth diplexer 160 has a common end 165, a first end 161, and a second end 162. The common end 165 of the fourth diplexer 160 is coupled to the second antenna 120. In some embodiments, each of the first diplexer 130, the second diplexer 140, the third diplexer 150, and the fourth diplexer 160 is configured as a frequency divider or a frequency combiner in response to different signal transmission directions. For example, if the common end of any diplexer receives a dual-band combination signal, the first end and the second end of such a diplexer can output a first frequency signal and a second frequency signal, respectively (i.e., the aforementioned diplexer may be considered as a frequency divider). Alternatively, if the first end and the second end of any diplexer receive a first frequency signal and a second frequency signal, respectively, the common end of such a diplexer can output a dual-band combination signal (i.e., the aforementioned diplexer may be considered as a frequency combiner).

The first coupler 170 has a first port 171, a second port 172, a third port 173, and a fourth port 174. The first port 171 of the first coupler 170 is coupled to the first end 131 of the first diplexer 130. The second port 172 of the first coupler 170 is coupled to the first end 141 of the second diplexer 140. The third port 173 of the first coupler 170 is coupled to the first end 151 of the third diplexer 150. The fourth port 174 of the first coupler 170 is coupled to the first end 161 of the fourth diplexer 160. The second coupler 180 has a first port 181, a second port 182, a third port 183, and a fourth port 184. The first port 181 of the second coupler 180 is coupled to the second end 132 of the first diplexer 130. The second port 182 of the second coupler 180 is coupled to the second end 142 of the second diplexer 140. The third port 183 of the second coupler 180 is coupled to the second end 152 of the third diplexer 150. The fourth port 184 of the second coupler 180 is coupled to the second end 162 of the fourth diplexer 160. In some embodiments, each of the first coupler 170 and the second coupler 180 is a branch-line coupler. For example, any coupler may have an input port, a first output port, a second output port, and an isolation port. If the input port of any coupler receives an input signal, its first output port and second output port can output a first output signal and a second output signal, respectively, and its isolation port cannot generate any signal. The input port, the first output port, the second output port, and the isolation port may freely correspond to the first port, the second port, the third port, and the fourth port of any coupler.

Figure 2A:
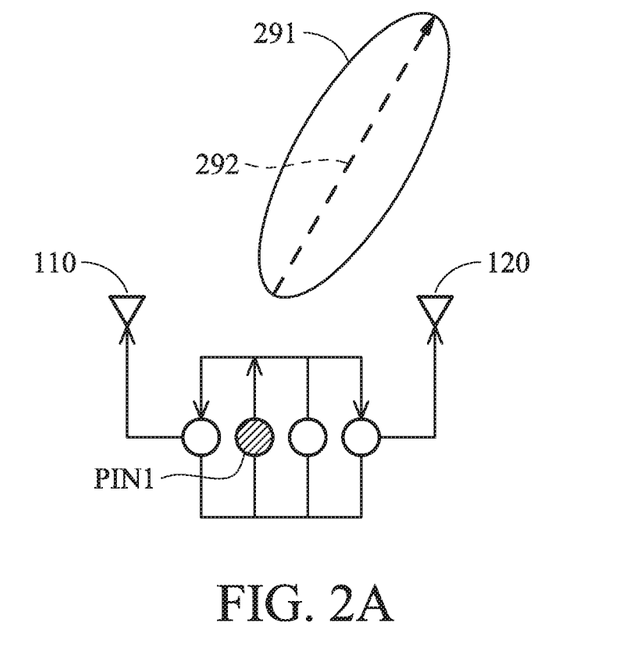
FIG. 2A is a diagram of a communication system in a first operation mode according to an embodiment of the invention.
Figure 2B:
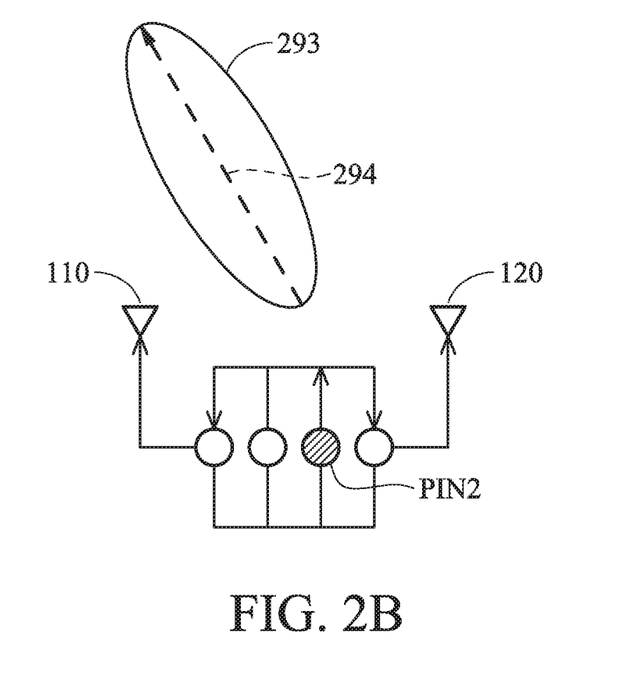
FIG. 2B is a diagram of a communication system in a second operation mode according to an embodiment of the invention.

Either the first input port PIN1 or the second input port PIN2 of the communication system 100 may be coupled to a dual-band signal source (e.g., a 2.4 GHz/5 GHz signal source). In such a design, the radiation patterns of both of the first antenna 110 and the second antenna 120 can be fine-tuned. FIG. 2A is a diagram of the communication system 100 in a first operation mode according to an embodiment of the invention. In the embodiment of FIG. 2A, the communication system 100 is fed by the first input port PIN1, such that a synthetic beam 291 of the first antenna 110 and the second antenna 120 is emitted in a first direction 292. FIG. 2B is a diagram of the communication system 100 in a second operation mode according to an embodiment of the invention. In the embodiment of FIG. 2B, the communication system 100 is fed by the second input port PIN2, such that a synthetic beam 293 of the first antenna 110 and the second antenna 120 is emitted in a second direction 294 which is different from the aforementioned first direction 292. With the design of the invention, the first antenna 110 and the second antenna 120 can share a single matching network (including all diplexers and all couplers) to fine-tune the direction of the dual-band radiation beam. Therefore, the total size of the communication system 100 is significantly reduced.

The following embodiments will introduce a variety of implementation and configurations of the communication system 100. It should be understood that these figures and descriptions are merely exemplary, rather than limitations of the invention.

Figure 3A:
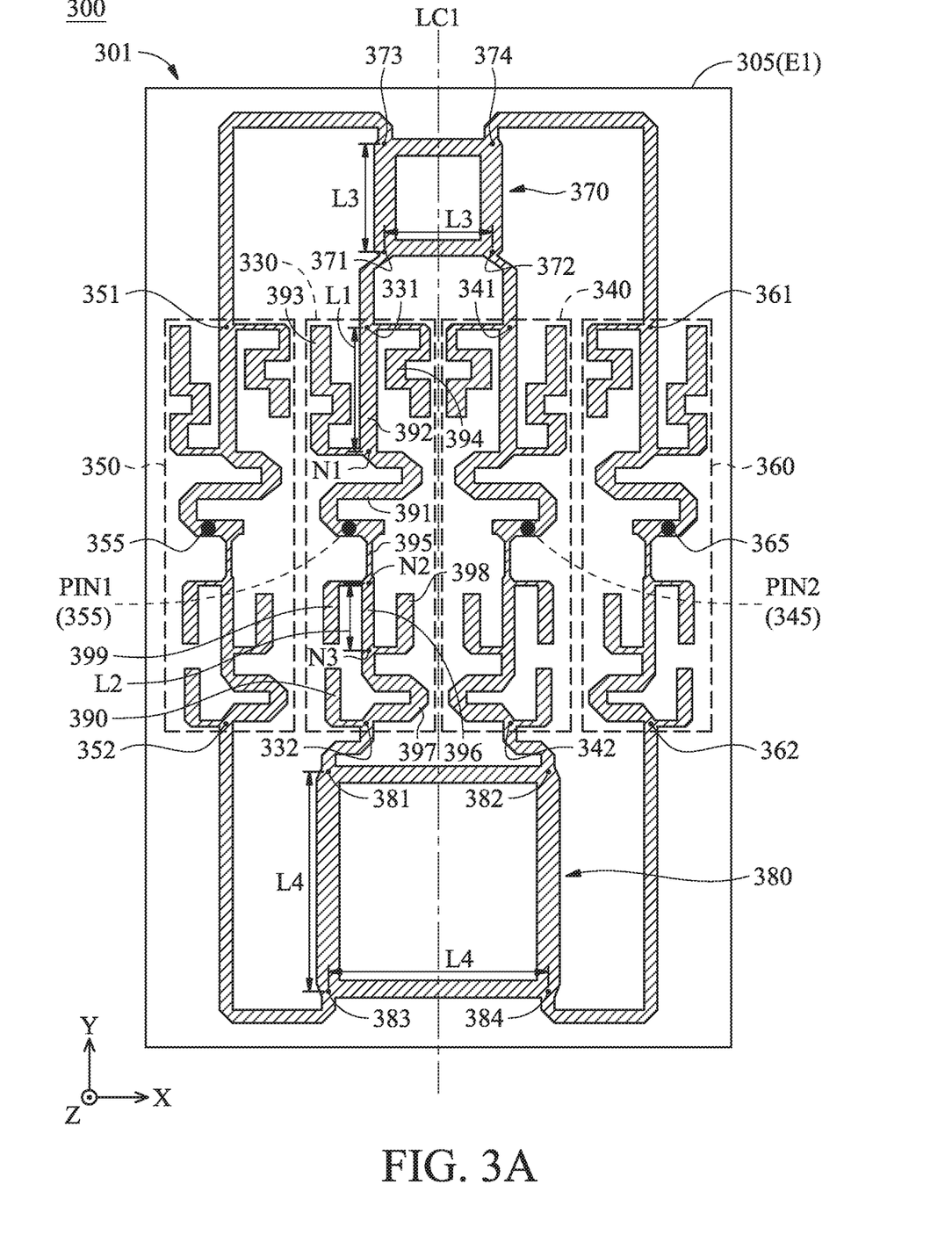
FIG. 3A is a top view of a communication system according to an embodiment of the invention.
Figure 3B:
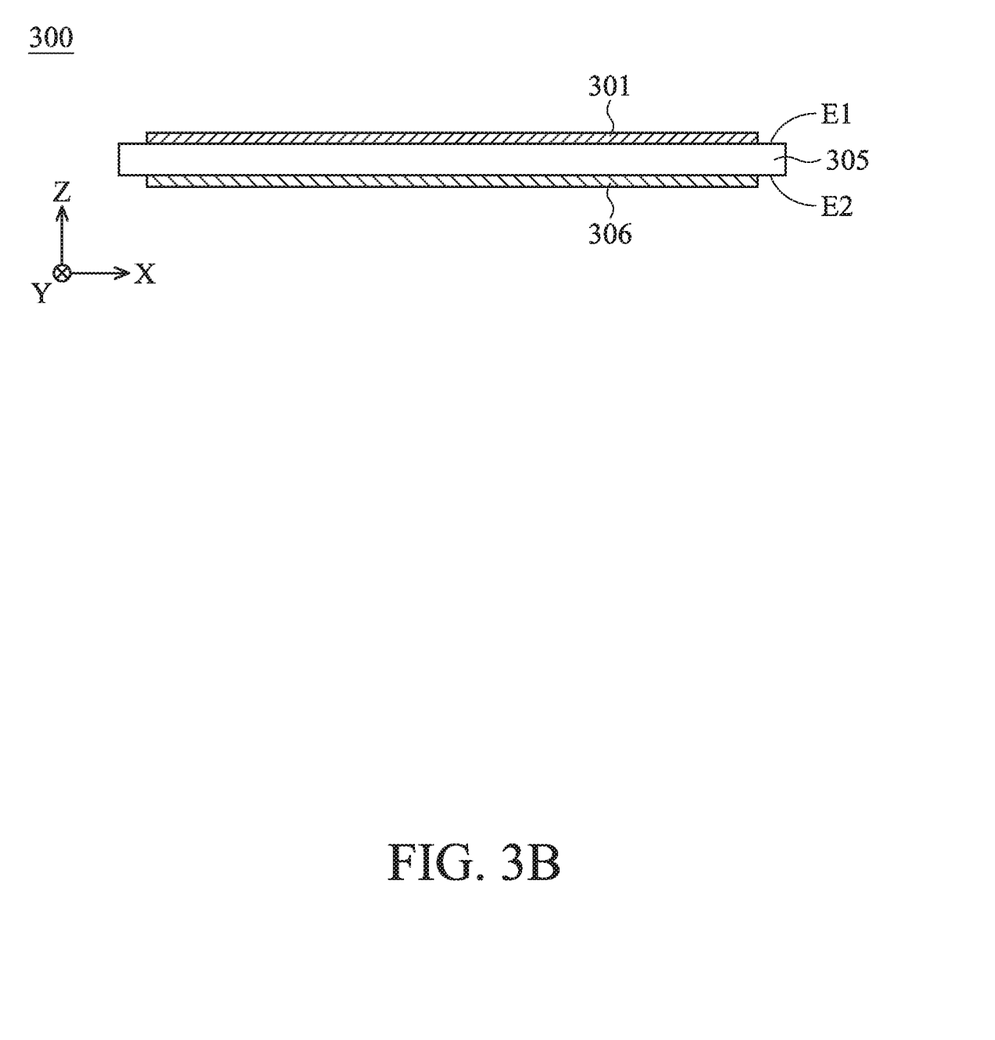
FIG. 3B is a side view of a communication system according to an embodiment of the invention.

FIG. 3A is a top view of a communication system 300 according to an embodiment of the invention. FIG. 3B is a side view of the communication system 300 according to an embodiment of the invention. As shown in FIG. 3B, the communication system 300 is formed by a circuit pattern 301, a dielectric substrate 305, and a ground plane 306. The circuit pattern 301 and the ground plane 306 may be made of metal materials. The dielectric substrate 305 may be an FR4 (Flame Retardant 4) substrate, a PCB (Printed Circuit Board), or an FCB (Flexible Circuit Board). The dielectric substrate 305 has a first surface E1 and a second surface E2 which are opposite to each other. The circuit pattern 301 is formed on the first surface E1 of the dielectric substrate 305 (as shown in FIG. 3A). The ground plane 306 is formed on the second surface E2 of the dielectric substrate 305. In the embodiment of FIG. 3A and FIG. 3B, the communication system 300 with a first input port PIN1 and a second input port PIN2 includes a first antenna (not shown), a second antenna (not show), a first diplexer 330, a second diplexer 340, a third diplexer 350, a fourth diplexer 360, a first coupler 370, and a second coupler 380.

In some embodiments, each of the first antenna and the second antenna is a dual-band antenna, thus the communication system 300 can cover a first frequency band and a second frequency band. For example, the aforementioned first frequency band may be from 2400 MHz to 2500 MHz, and the aforementioned second frequency band may be from 5150 MHz to 5850 MHz. Therefore, the communication system 300 can support at least the dual-band operations of WLAN (Wireless Local Area Networks) 2.4 GHz/5 GHz.

The first diplexer 330 has a common end 335, a first end 331, and a second end 332. The common end 335 of the first diplexer 330 is coupled to the first input port PIN1. The second diplexer 340 has a common end 345, a first end 341, and a second end 342. The common end 345 of the second diplexer 340 is coupled to the second input port PIN2. The third diplexer 350 has a common end 355, a first end 351, and a second end 352. The common end 355 of the third diplexer 350 is coupled to the first antenna. The fourth diplexer 360 has a common end 365, a first end 361, and a second end 362. The common end 365 of the fourth diplexer 360 is coupled to the second antenna.

The first diplexer 330, the second diplexer 340, the third diplexer 350, and the fourth diplexer 360 can have the same structures or mirrored structures. For example, the first diplexer 330 and the third diplexer 350 may have the same structures, and the second diplexer 340 and the fourth diplexer 360 may have the same structures. The first diplexer 330 and the third diplexer 350 may be symmetrical to the second diplexer 340 and the fourth diplexer 360 with respect to a central axis LC1 of the communication system 300 (mirrored images). The following embodiments will introduce the detailed structure of each diplexer, using the first diplexer 330 as an example. It should be understood that the second diplexer 340, the third diplexer 350, and the fourth diplexer 360 will not be illustrated again herein.

The first diplexer 330 includes a first branch 391, a second branch 392, a third branch 393, and a fourth branch 394, which can form a first band-rejection filter for filtering out the signals in the first frequency band, and for passing the signals in the second frequency band. The first branch 391 may substantially have an S-shape. The first branch 391 is coupled to the common end 335 of the first diplexer 330 and a first node N1. The second branch 392 may substantially have a straight-line shape. The second branch 392 is coupled between the first node N1 and the first end 331 of the first diplexer 330. The third branch 393 may substantially have a meandering shape. The third branch 393 has a first end and a second end. The first end of the third branch 393 is coupled to the first node N1. The second end of the third branch 393 is an open end. The fourth branch 394 may substantially have a meandering shape. The fourth branch 394 has a first end and a second end. The first end of the fourth branch 394 is coupled to the first end 331 of the first diplexer 330. The second end of the fourth branch 394 is an open end. The second end of the fourth branch 394 and the second end of the third branch 393 may extend in opposite directions. In some embodiments, the length L1 of each of the first branch 391, the second branch 392, the third branch 393, and the fourth branch 394 is substantially equal to 0.25 wavelength (λ/4) of the first frequency band of the communication device 300.

The first diplexer 330 further includes a fifth branch 395, a sixth branch 396, a seventh branch 397, an eighth branch 398, a ninth branch 399, and a tenth branch 390, which can form a second band-rejection filter for filtering out the signals in the second frequency band, and for passing the signals in the first frequency band. The fifth branch 395 may substantially have a straight-line shape, whose line width is the thinnest among all of the branches. The fifth branch 395 is coupled between the common end 335 of the first diplexer 330 and a second end N2. The sixth branch 396 may substantially have a straight-line shape. The sixth branch 396 is coupled between the second node N2 and a third node N3. The seventh branch 397 may substantially have a U-shape. The seventh branch 397 is coupled between the third node N3 and the second end 332 of the first diplexer 330. The eighth branch 398 may substantially have an L-shape. The eighth branch 398 has a first end and a second end. The first end of the eighth branch 398 is coupled to the third node N3. The second end of the eighth branch 398 is an open end. The ninth branch 399 may substantially have an L-shape. The ninth branch 399 has a first end and a second end. The first end of the ninth branch 399 is coupled to the second node N2. The second end of the ninth branch 399 is an open end. The second end of the ninth branch 399 and the second end of the eighth branch 398 may extend in opposite directions. The tenth branch 390 may substantially have an L-shape. The tenth branch 390 has a first end and a second end. The first end of the tenth branch 390 is coupled to the second end 332 of the first diplexer 330. The second end of the tenth branch 390 is an open end. The second end of the tenth branch 390 and the second end of the ninth branch 399 may extend toward each other. In some embodiments, the length L2 of each of the fifth branch 395, the sixth branch 396, the seventh branch 397, the eighth branch 398, the ninth branch 399, and the tenth branch 390 is substantially equal to 0.25 wavelength (λ/4) of the second frequency band of the communication system 300.

The first coupler 370 has a first port 371, a second port 372, a third port 373, and a fourth port 374. The first port 371 of the first coupler 370 is coupled to the first end 331 of the first diplexer 330. The second port 372 of the first coupler 370 is coupled to the first end 341 of the second diplexer 340. The third port 373 of the first coupler 370 is coupled to the first end 351 of the third diplexer 350. The fourth port 374 of the first coupler 370 is coupled to the first end 361 of the fourth diplexer 360. The second coupler 380 has a first port 381, a second port 382, a third port 383, and a fourth port 384. The first port 381 of the second coupler 380 is coupled to the second end 332 of the first diplexer 330. The second port 382 of the second coupler 380 is coupled to the second end 342 of the second diplexer 340. The third port 383 of the second coupler 380 is coupled to the second end 352 of the third diplexer 350. The fourth port 384 of the second coupler 380 is coupled to the second end 362 of the fourth diplexer 360.

The first coupler 370 may substantially have a first hollow square shape for converting the signals in the second frequency band. When the communication system 300 is fed by the first input port PIN1, the first port 371 of the first coupler 370 is used as an input port, the second port 372 of the first coupler 370 is used as an isolation port, and the third port 373 and the fourth port 374 of the first coupler 370 are used as two output ports with a 90-degree phase difference (the phase of the third port 373 is leading by 90 degrees). When the communication system 300 is fed by the second input port PIN2, the second port 372 of the first coupler 370 is used as an input port, the first port 371 of the first coupler 370 is used as an isolation port, and the third port 373 and the fourth port 374 of the first coupler 370 are used as two output ports with a 90-degree phase difference (the phase of the fourth port 374 is leading by 90 degrees). In some embodiments, the length L3 of each side of the first hollow square shape is substantially equal to 0.25 wavelength (λ/4) of the second frequency band of the communication system 300.

The second coupler 380 may substantially have a second hollow square shape for converting the signals in the first frequency band. When the communication system 300 is fed by the first input port PIN1, the first port 381 of the second coupler 380 is used as an input port, the second port 382 of the second coupler 380 is used as an isolation port, and the third port 383 and the fourth port 384 of the second coupler 380 are used as two output ports with a 90-degree phase difference (the phase of the third port 383 is leading by 90 degrees). When the communication system 300 is fed by the second input port PIN2, the second port 382 of the second coupler 380 is used as an input port, the first port 381 of the second coupler 380 is used as an isolation port, and the third port 383 and the fourth port 384 of the second coupler 380 are used as two output ports with a 90-degree phase difference (the phase of the fourth port 384 is leading by 90 degrees). In some embodiments, the length L4 of each side of the second hollow square shape is substantially equal to 0.25 wavelength (λ/4) of the first frequency band of the communication system 300.

Figure 4A:
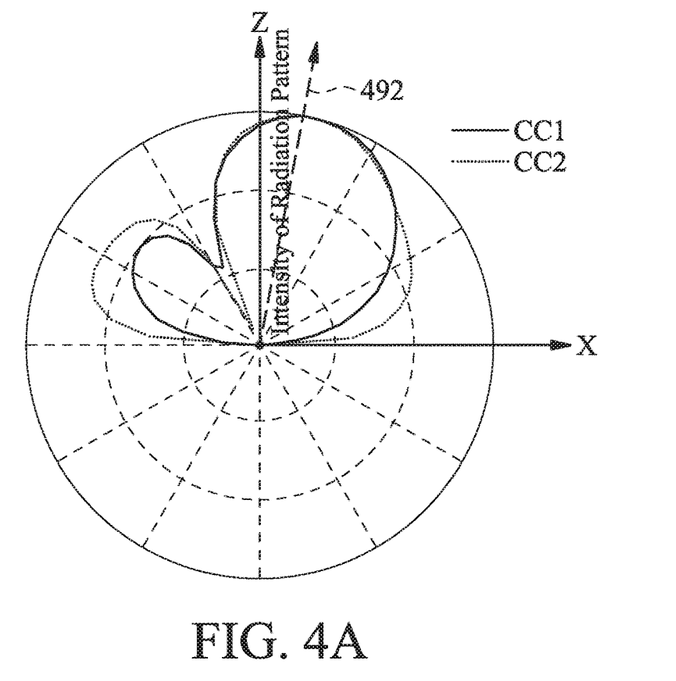
FIG. 4A is a radiation pattern of a communication system in a first operation mode according to an embodiment of the invention.

FIG. 4A is a radiation pattern of the communication system 300 in a first operation mode according to an embodiment of the invention. In the embodiment of FIG. 4A, the communication system 300 is fed by the first input port PIN1. A first curve CC1 represents the synthetic radiation pattern of the first antenna and the second antenna operating in the first frequency band. A second curve CC2 represents the synthetic radiation pattern of the first antenna and the second antenna operating in the second frequency band. According to the measurement of FIG. 4A, the synthetic beam of the first antenna and the second antenna is emitted in a first direction 492, regardless of whether it is operating in the first frequency band or the second frequency band.

Figure 4B:
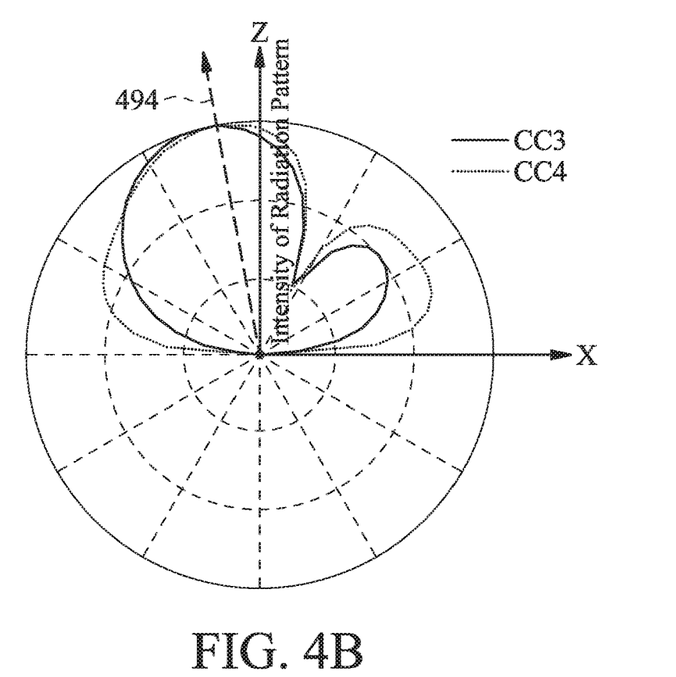
FIG. 4B is a radiation pattern of a communication system in a second operation mode according to an embodiment of the invention.

FIG. 4B is a radiation pattern of the communication system 300 in a second operation mode according to an embodiment of the invention. In the embodiment of FIG. 4B, the communication system 300 is fed by the second input port PIN2. A third curve CC3 represents the synthetic radiation pattern of the first antenna and the second antenna operating in the first frequency band. A fourth curve CC4 represents the synthetic radiation pattern of the first antenna and the second antenna operating in the second frequency band. According to the measurement of FIG. 4B, the synthetic beam of the first antenna and the second antenna is emitted in a second direction 494, which is different from the first direction 492 of FIG. 4A, regardless of whether it is operating in the first frequency band or the second frequency band.

By selecting an appropriate feeding point, the communication system 300 can provide synthetic beams in a variety of directions, so as to be able to meet the specific requirements of different applications. Other features of the communication system 300 of FIG. 3A and FIG. 3B are similar to those of the communication system 100 of FIG. 1. Accordingly, the two embodiments can achieve similar levels of performance.

FIG. 5 is a flowchart of a communication method according to an embodiment of the invention. To begin, in step S510, a communication system is provided. The communication system with a first input port and a second input port includes a first antenna, a second antenna, a first diplexer, a second diplexer, a third diplexer, a fourth diplexer, a first coupler, and a second coupler. The first diplexer is coupled to the first input port, the first coupler, and the second coupler. The second diplexer is coupled to the second input port, the first coupler, and the second coupler. The first antenna is coupled through the third diplexer to the first coupler and the second coupler. The second antenna is coupled through the fourth diplexer to the first coupler and the second coupler. In step S520, a dual-band signal is inputted to the first diplexer and the second diplexer. The dual-band signal includes a first band signal and a second band signal. Both the first diplexer and the second diplexer are configured to separate the first band signal from the second band signal. In step S530, the first band signal and the second band signal which are separated by the first diplexer are inputted to the first coupler and the second coupler, respectively, so as to generate a first phase difference. In step S540, the first band signal and the second band signal which are separated by the second diplexer are inputted to the first coupler and the second coupler, respectively, so as to generate a second phase difference. In step S550, the first band signal and the second band signal which have the first phase difference are combined by the third diplexer, so as to form a first phase dual-band signal. In step S560, the first band signal and the second band signal which have the second phase difference are combined by the fourth diplexer, so as to form a second phase dual-band signal. Finally, in step S570, the first phase dual-band signal is transmitted by the first antenna, and the second phase dual-band signal is transmitted by the second antenna, so as to form a synthetic beam toward a direction. It should be noted that the above steps are not required to be performed in order, and all of the features of the communication systems of FIGS. 1 to 4 may be applied to the communication method of FIG. 5.

Figure 6:
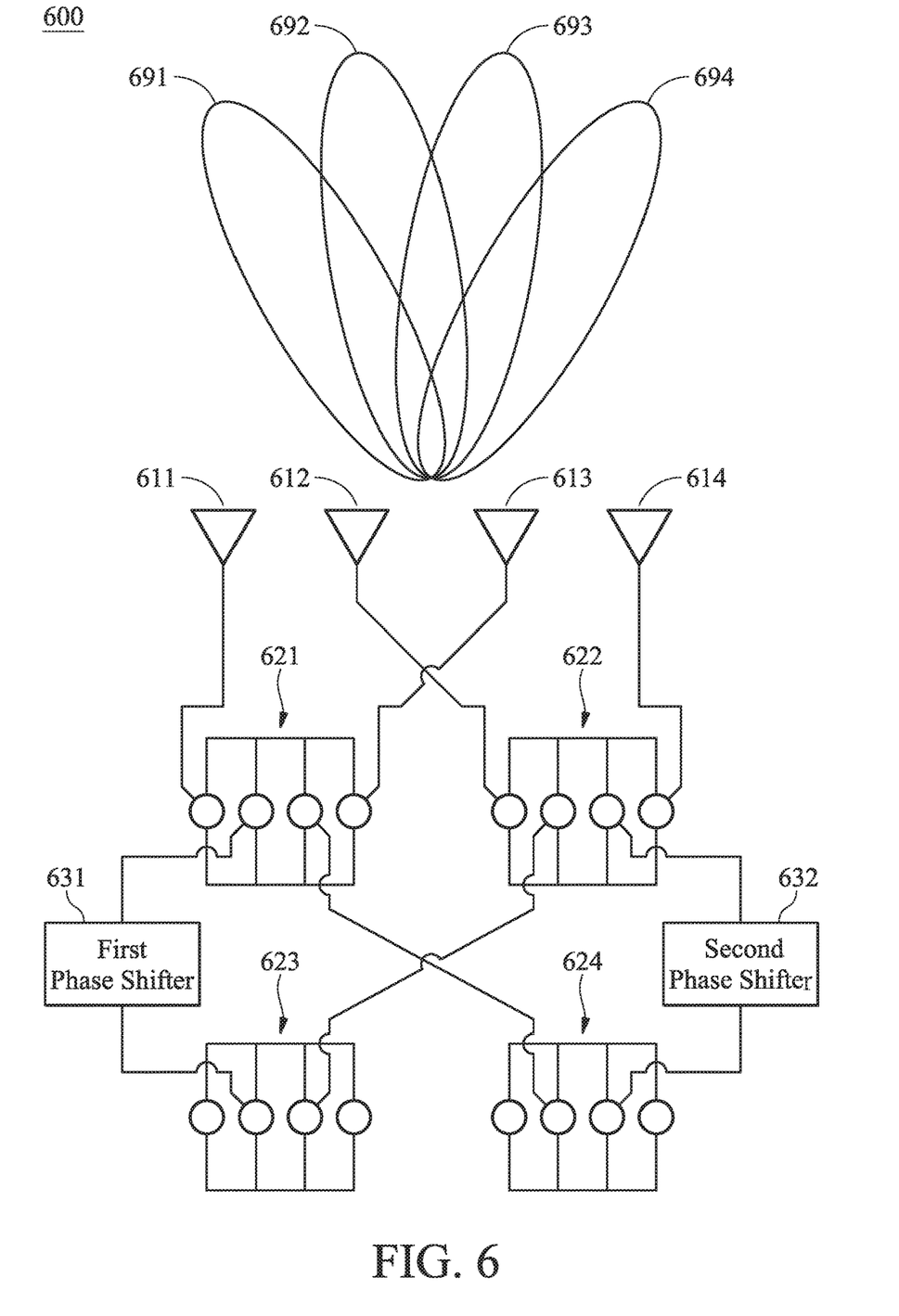
FIG. 6 is a diagram of a communication system according to another embodiment of the invention.

FIG. 6 is a diagram of a communication system 600 according to another embodiment of the invention. In the embodiment of FIG. 6, the communication system includes a first antenna 611, a second antenna 612, a third antenna 613, a fourth antenna 614, a first matching network 621, a second matching network 622, a third matching network 623, a fourth matching network 624, a first phase shifter 631, and a second phase shifter 632. The structure of each matching network (including a plurality of diplexers and a plurality of couplers) may be described as the embodiment of FIG. 3A and FIG. 3B. Similarly, by selecting an appropriate feeding point, the communication system 600 can use the first antenna 611, the second antenna 612, the third antenna 613, and the fourth antenna 614 to generate different synthetic beams 691, 692, 693, and 694. Other features of the communication system 600 of FIG. 6 are similar to those of the communication system 100 of FIG. 1. Accordingly, the two embodiments can achieve similar levels of performance.

The invention proposes a novel communication system which integrates a dual-band antenna with its corresponding matching networks, so as to effective use the internal design space of the communication system. Generally, the invention has at least the advantages of small size, tunable radiation beam, and low manufacturing cost, and therefore it is suitable for application in a variety of small devices.

Note that the above element sizes, element shapes, and frequency ranges are not limitations of the invention. A designer can fine-tune these settings or values to meet different requirements. It should be understood that the communication system and communication method of the invention are not limited to the configurations of FIGS. 1-6. The invention may merely include any one or more features of any one or more embodiments of FIGS. 1-6. In other words, not all of the features displayed in the figures should be implemented in the communication system and communication method of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A communication system with a first input port and a second input port, comprising:
   a first antenna;
   a second antenna;
   a first diplexer, having a common end, a first end, and a second end, wherein the common end of the first diplexer is coupled to the first input port;
   a second diplexer, having a common end, a first end, and a second end, wherein the common end of the second diplexer is coupled to the second input port;
   a third diplexer, having a common end, a first end, and a second end, wherein the common end of the third diplexer is coupled to the first antenna;
   a fourth diplexer, having a common end, a first end, and a second end, wherein the common end of the fourth diplexer is coupled to the second antenna;
   a first coupler, having a first port, a second port, a third port, and a fourth port, wherein the first port of the first coupler is coupled to the first end of the first diplexer, the second port of the first coupler is coupled to the first end of the second diplexer, the third port of the first coupler is coupled to the first end of the third diplexer, and the fourth port of the first coupler is coupled to the first end of the fourth diplexer; and
   a second coupler, having a first port, a second port, a third port, and a fourth port, wherein the first port of the second coupler is coupled to the second end of the first diplexer, the second port of the second coupler is coupled to the second end of the second diplexer, the third port of the second coupler is coupled to the second end of the third diplexer, and the fourth port of the second coupler is coupled to the second end of the fourth diplexer.

2. The communication system as claimed in claim 1, wherein when the communication system is fed by the first input port, a synthetic beam of the first antenna and the second antenna is emitted in a first direction, and when the communication system is fed by the second input port, the synthetic beam of the first antenna and the second antenna is emitted in a second direction which is different from the first direction.

3. The communication system as claimed in claim 1, wherein both the first antenna and the second antenna cover a first frequency band and a second frequency band, the first frequency band is from 2400 MHz to 2500 MHz, and the second frequency band is from 5150 MHz to 5850 MHz.

4. The communication system as claimed in claim 1, wherein each of the first diplexer, the second diplexer, the third diplexer, and the fourth diplexer is configured as a frequency divider or a frequency combiner.

5. The communication system as claimed in claim 1, wherein each of the first coupler and the second coupler is a branch-line coupler.

6. The communication system as claimed in claim 3, wherein the first coupler substantially has a first hollow square shape, a length of each side of the first hollow square shape is substantially equal to 0.25 wavelength of the second frequency band, the second coupler substantially has a second hollow square shape, and a length of each side of the second hollow square shape is substantially equal to 0.25 wavelength of the first frequency band.

7. The communication system as claimed in claim 3, wherein each of the first diplexer, the second diplexer, the third diplexer, and the fourth diplexer comprises:
a first branch, coupled between the corresponding common end and a first node;
a second branch, coupled between the first node and the corresponding first end;
a third branch, coupled to the first node; and
a fourth branch, coupled to the corresponding first end.

8. The communication system as claimed in claim 7, wherein each of the first diplexer, the second diplexer, the third diplexer, and the fourth diplexer further comprises:
a fifth branch, coupled between the corresponding common end and a second node;
a sixth branch, coupled between the second node and a third node;
a seventh branch, coupled between the third node and the corresponding second end;
an eighth branch, coupled to the third node;
a ninth branch, coupled to the second node; and
a tenth branch, coupled to the corresponding second end.

9. The communication system as claimed in claim 7, wherein a length of each of the first branch, the second branch, the third branch, and the fourth branch is substantially equal to 0.25 wavelength of the first frequency band.

10. The communication system as claimed in claim 8, wherein a length of each of the fifth branch, the sixth branch, the seventh branch, the eighth branch, the ninth branch, and the tenth branch is substantially equal to 0.25 wavelength of the second frequency band.

11. A communication method, comprising the steps of:
providing a communication system, wherein the communication system with a first input port and a second input port comprises a first antenna, a second antenna, a first diplexer, a second diplexer, a third diplexer, a fourth diplexer, a first coupler, and a second coupler, wherein the first diplexer is coupled to the first input port, the first coupler, and the second coupler, wherein the second diplexer is coupled to the second input port, the first coupler, and the second coupler, wherein the first antenna is coupled through the third diplexer to the first coupler and the second coupler, and wherein the second antenna is coupled through the fourth diplexer to the first coupler and the second coupler;
inputting a dual-band signal to the first diplexer and the second diplexer, wherein the dual-band signal comprises a first band signal and a second band signal, and wherein both the first diplexer and the second diplexer are configured to separate the first band signal from the second band signal;
inputting the first band signal and the second band signal which are separated by the first diplexer to the first coupler and the second coupler, respectively, so as to generate a first phase difference;
inputting the first band signal and the second band signal which are separated by the second diplexer to the first coupler and the second coupler, respectively, so as to generate a second phase difference;
combining, via the third diplexer, the first band signal and the second band signal which have the first phase difference, so as to form a first phase dual-band signal;
combining, via the fourth diplexer, the first band signal and the second band signal which have the second phase difference, so as to form a second phase dual-band signal; and
transmitting, via the first antenna, the first phase dual-band signal, and transmitting, via the second antenna, the second phase dual-band signal, so as to form a synthetic beam toward a direction.

12. The communication method as claimed in claim 11, wherein both the first antenna and the second antenna cover a first frequency band and a second frequency band, the first frequency band is from 2400 MHz to 2500 MHz, and the second frequency band is from 5150 MHz to 5850 MHz.

13. The communication method as claimed in claim 11, wherein each of the first diplexer, the second diplexer, the third diplexer, and the fourth diplexer is configured as a frequency divider or a frequency combiner.

14. The communication method as claimed in claim 11, wherein each of the first coupler and the second coupler is a branch-line coupler.

15. The communication method as claimed in claim 12, wherein the first coupler substantially has a first hollow square shape, a length of each side of the first hollow square shape is substantially equal to 0.25 wavelength of the second frequency band, the second coupler substantially has a second hollow square shape, and a length of each side of the second hollow square shape is substantially equal to 0.25 wavelength of the first frequency band.

16. The communication method as claimed in claim 12, wherein each of the first diplexer, the second diplexer, the third diplexer, and the fourth diplexer comprises a first branch, a second branch, a third branch, and a fourth branch, and wherein the first branch is coupled between a corresponding common end and a first node, the second branch is coupled between the first node and a corresponding first end, the third branch is coupled to the first node, and the fourth branch is coupled to the corresponding first end.

17. The communication method as claimed in claim 16, wherein each of the first diplexer, the second diplexer, the third diplexer, and the fourth diplexer further comprises a fifth branch, a sixth branch, a seventh branch, an eighth branch, a ninth branch, and a tenth branch, and wherein the fifth branch is coupled between the corresponding common end and a second node, the sixth branch is coupled between the second node and a third node, the seventh branch is coupled between the third node and a corresponding second end, the eighth branch is coupled to the third node, the ninth branch is coupled to the second node, and the tenth branch is coupled to the corresponding second end.

18. The communication method as claimed in claim 16, wherein a length of each of the first branch, the second branch, the third branch, and the fourth branch is substantially equal to 0.25 wavelength of the first frequency band.

19. The communication method as claimed in claim 17, wherein a length of each of the fifth branch, the sixth branch, the seventh branch, the eighth branch, the ninth branch, and the tenth branch is substantially equal to 0.25 wavelength of the second frequency band.

* * * * *